US008672737B2

(12) United States Patent
Sugano

(10) Patent No.: US 8,672,737 B2
(45) Date of Patent: Mar. 18, 2014

(54) SLOT MACHINE WITH INSURANCE PAYOUT PROPORTIONAL TO AVERAGE BET AMOUNT

(75) Inventor: Kenta Sugano, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 792 days.

(21) Appl. No.: 12/589,513

(22) Filed: Oct. 28, 2008

(65) Prior Publication Data

US 2010/0105468 A1 Apr. 29, 2010

(51) Int. Cl.
*A63F 9/24* (2006.01)
*A63F 13/00* (2006.01)

(52) U.S. Cl.
USPC .............................................. 463/16; 463/20

(58) Field of Classification Search
USPC .............................................. 463/16, 20
See application file for complete search history.

(56) References Cited

U.S. PATENT DOCUMENTS

| | | | | | |
|---|---|---|---|---|---|
| 4,669,731 | A | * | 6/1987 | Clarke | 463/20 |
| 5,178,390 | A | * | 1/1993 | Okada | 273/143 R |
| 5,695,402 | A | * | 12/1997 | Stupak | 463/20 |
| 5,702,303 | A | * | 12/1997 | Takemoto et al. | 463/27 |
| 5,910,048 | A | * | 6/1999 | Feinberg | 463/25 |
| 6,012,983 | A | | 1/2000 | Walker et al. | |
| 6,093,102 | A | | 7/2000 | Bennett | |
| 6,270,409 | B1 | * | 8/2001 | Shuster | 463/20 |
| 6,960,133 | B1 | | 11/2005 | Marks et al. | |
| 7,722,459 | B2 | * | 5/2010 | Kane et al. | 463/25 |
| 7,775,879 | B2 | * | 8/2010 | Walker et al. | 463/25 |
| 7,780,521 | B2 | * | 8/2010 | Inamura | 463/25 |
| 2002/0152120 | A1 | * | 10/2002 | Howington | 705/14 |
| 2004/0106446 | A1 | * | 6/2004 | Cannon et al. | 463/16 |
| 2007/0105609 | A1 | * | 5/2007 | Okada | 463/16 |
| 2008/0064475 | A1 | * | 3/2008 | Okada | 463/20 |
| 2008/0153571 | A1 | * | 6/2008 | Okada | 463/20 |
| 2008/0254860 | A1 | * | 10/2008 | Fujimoto et al. | 463/20 |
| 2008/0254869 | A1 | * | 10/2008 | Fujimoto et al. | 463/27 |
| 2008/0254873 | A1 | * | 10/2008 | Fujimoto et al. | 463/27 |
| 2008/0254874 | A1 | * | 10/2008 | Fujimoto et al. | 463/27 |
| 2010/0304835 | A1 | * | 12/2010 | Okada et al. | 463/20 |

FOREIGN PATENT DOCUMENTS

| | | |
|---|---|---|
| AU | 200119729 | 2/2001 |
| AU | 200119729 | 9/2001 |

* cited by examiner

*Primary Examiner* — Lawrence Galka
(74) *Attorney, Agent, or Firm* — Sheppard, Mullin, Richter & Hampton LLP

(57) ABSTRACT

A gaming machine of the present invention is arranged so that, in a base game in which unit games can be repeatedly run, bet values on the respective unit games are accumulatively stored in the bet value memory, how many unit games are run is counted, an average of the bet values is calculated based on the bet value accumulatively stored in the bet value memory when a predetermined condition is met in the base game, and a payout calculated by multiplying the average by a predetermined value is awarded.

14 Claims, 12 Drawing Sheets

FIG. 5

| | | DISPLAY WINDOW 151 | DISPLAY WINDOW 152 | DISPLAY WINDOW 153 |
|---|---|---|---|---|
| CODE NUMBERS | RANDOM NUMBER RANGES | SYMBOLS | SYMBOLS | SYMBOLS |
| 00 | 0~3277 | BAR × 3 | BAR × 2 | BAR × 2 |
| 01 | 3278~6555 | WHITE 7 | BLANK | BLUE 7 |
| 02 | 6556~9833 | BLANK | BAR | BLANK |
| 03 | 9834~13111 | BLUE 7 | BLANK | BAR × 3 |
| 04 | 13112~16389 | BLANK | BAR × 2 | BAR |
| 05 | 16390~19667 | BAR × 2 | BLANK | RED 7 |
| 06 | 19668~22945 | BLANK | WHITE 7 | BLANK |
| 07 | 22946~26223 | BAR × 3 | RED 7 | WHITE 7 |
| 08 | 26224~29501 | BLANK | BAR | BAR |
| 09 | 29502~32779 | BAR | BLANK | BAR × 3 |
| 10 | 32780~36057 | BLANK | BAR × 3 | WHITE 7 |
| 11 | 36058~39335 | BAR | BLANK | BAR |
| 12 | 39336~42613 | BAR × 3 | BAR | BAR × 2 |
| 13 | 42614~45891 | WHITE 7 | BLUE 7 | BLANK |
| 14 | 45892~49169 | RED 7 | BAR × 3 | BLUE 7 |
| 15 | 49170~52447 | BAR × 2 | WHITE 7 | BLANK |
| 16 | 52448~55725 | BLUE 7 | BLUE 7 | BAR × 3 |
| 17 | 55726~59003 | BAR | BAR × 3 | BLANK |
| 18 | 59004~62281 | BLANK | BAR × 2 | BAR × 2 |
| 19 | 62282~65535 | BAR × 2 | BLANK | BLANK |

(RANGE OF RANDOM NUMBERS: 0~65535)

FIG.6
BASE GAME PAYOUT TABLE (PER ONE BET)
| WINNING | NUMBER OF PAYOUT |
|---|---|
| BAR BAR BAR / BAR BAR BAR / BAR BAR BAR | 60 |
| BAR BAR BAR / BAR BAR BAR | 40 |
| BAR BAR BAR | 20 |
| ANY BAR ANY BAR ANY BAR | 10 |
| BLANK BLANK BLANK | 1 |
|  | 600 |
|  | 300 |
|   | 100 |

SLOT MACHINE WITH INSURANCE PAYOUT PROPORTIONAL TO AVERAGE BET AMOUNT

BACKGROUND OF THE INVENTION

1. Field of the Invention

The present invention relates to a gaming machine and a playing method thereof.

2. Description of Related Art

Known gaming machines run slot games in each of which plural types of symbols are scrolled and then stopped and a predetermined number of game media (e.g. a predetermined number of coins or a predetermined amount of money) is awarded based on the combination of the stopped symbols. Such gaming machines are disclosed in, for example, the specifications of U.S. Pat. Nos. 6,960,133, 6,012,983, and 6,093,102.

Such gaming machines include a gaming machine which awards a prize when a predetermined condition is met in a game (e.g. predetermined symbols are rearranged in a slot game). For example, the specification of Australian Unexamined Patent Publication No. 1972901 discloses a slot machine which runs a free game as an auxiliary game when a predetermined condition (i.e. a particular set of symbols) is met in a base game. Since a free game is playable without betting a game medium, players playing slot games typically long for free games.

Taking this into account, the inventor of the present invention came up with an idea that players may be attracted to play games when a prize which is awarded in response to the realization of a predetermined condition in a game has a feature which is unexpected in the above-described prior art.

An object of the present invention is to provide a gaming machine and a playing method thereof, which feature an entertainment characteristic unexpected in the above-described prior art.

SUMMARY OF THE INVENTION

The present invention relates to a gaming machine which includes: a bet input unit which makes it possible to input a bet; a base game in which a unit game which starts in response to the input of a bet can be repeatedly run; a bet value memory in which a bet value of the bet is accumulatively stored; and a controller which is programmed to perform the steps (a1) to (a5). The controller performs: (a1) receiving the input of the bet from the bet input unit; (a2) after receiving the input of the bet, running the unit game at a predetermined timing and awarding a base payout based on a result of the unit game and the bet value of the bet; (a3) in the base game, accumulatively storing the bet value in the bet value memory each time the unit game is run; (a4) in the base game, counting how many times the unit game is run; and (a5) when the predetermined condition is met in the base game, calculating an average of the bet value bet on each of the counted unit game, based on the bet value accumulatively stored in the bet value memory, and awarding a special payout which is calculated by multiplying the average by a predetermined value.

According to this structure, a bet is input from the bet input unit. After the input of the bet, a unit game is run at a predetermined timing, and a payout is awarded based on the result of the unit game and the bet value of the bet. In a base game in which unit games are repeatedly run, a bet value of a bet is accumulatively stored in the bet value memory each time a unit game is run. In a base game, how many times unit games are run is counted. When a predetermined condition is met in a base game, an average of bet values betted on the counted unit games is calculated based on the bet value accumulatively stored in the bet value memory, and a result of multiplying the average by a predetermined value is awarded.

In short, awarded are not only a base payout as a result of a unit game but also a special payout when a predetermined condition is met in a base game. Furthermore, since the special payout is calculated by multiplying an average of the bet values bet in the base game by a predetermined value, a special payout is fairly awarded when a predetermined condition is met in a base game. Therefore a new entertainment characteristic is achieved.

In addition to the above, the present invention relates to the aforesaid gaming machine which further includes a mode switch input unit which makes it possible to switch between an insured mode and an uninsured mode, wherein, the controller is programmed to execute the steps (a3) , (a4), and (a5) only when the mode switch input unit sets the gaming machine in the insured mode.

According to the structure above, the processes related to a special payout are executed only when the insured mode is set by the mode switch input unit which can switch between the insured mode and the uninsured mode. This allows the player to play games in a desired mode and hence an entertainment characteristic is further enhanced.

For example, provided that a required bet value in the insured mode is higher than in the uninsured mode, the player can choose either the insured mode in which a special payout may be awarded while each bet value is high or the uninsured mode in which no special payout is awarded but each bet value is low.

The present invention also relates to a gaming machine which includes: a bet input unit which makes it possible to input a bet; a base game in which a unit game which starts in response to the input of a bet can be repeatedly run; a bet value memory in which a bet value of the bet is accumulatively stored; and a controller which is programmed to perform the steps (b1) to (b5). The controller performs: (b1) receiving the input of the bet from the bet input unit; (b2) after receiving the input of the bet, running the unit game at a predetermined timing and awarding a base payout based on a result of the unit game and the bet value of the bet; (b3) in the base game, accumulatively storing the bet value in the bet value memory each time the unit game is run; (b4) in the base game, counting how many times the unit game is run; and (b5) when the number of the unit game counted in the step (b4) reaches a predetermined number, calculating an average of the bet value bet on each of the counted unit game, based on the bet value accumulatively stored in the bet value memory, and awarding a special payout which is calculated by multiplying the average by a predetermined value.

According to the above-described structure, the input of a bet is received from the bet input unit. After receiving the input of the bet, a unit game is run at a predetermined timing, and a payout is awarded based on the result of the unit game and the bet value of the bet. In a base game in which unit games can be repeatedly run, the bet values on the respective unit games are accumulatively stored in the bet value memory. In the base game, how many unit games are run is counted. When the counted number of unit games in the base game reaches a predetermined number, an average of the bet values bet on the counted unit games is calculated based on the bet value accumulatively stored in the bet value memory, and a payout calculated by multiplying the average by a predetermined value is awarded.

In other words, awarded are not only a base payout as a result of a unit game but also a special payout when unit games are run for a predetermined number of times in a base game. Since a special payout is awarded when the player continuously plays base games, the player is motivated to continuously play games. Furthermore, since a special payout is calculated by multiplying an average of bet values bet in a base game by a predetermined value, the special payout is fairly awarded when a predetermined condition is met in the base game. Therefore a new entertainment characteristic is achieved.

In addition to the above, the present invention relates to the aforesaid gaming machine which further includes a mode switch input unit which makes it possible to switch between an insured mode and an uninsured mode, wherein, the controller is programmed to execute the steps (b3), (b4), and (b5) only when the mode switch input unit sets the gaming machine in the insured mode.

According to the structure above, the processes related to a special payout are executed only when the insured mode is set by the mode switch input unit which can switch between the insured mode and the uninsured mode. This allows the player to play games in a desired mode and hence an entertainment characteristic is further enhanced.

For example, provided that a required bet value in the insured mode is higher than in the uninsured mode, the player can choose either the insured mode in which a special payout may be awarded while each bet value is high or the uninsured mode in which no special payout is awarded but each bet value is low.

The present invention relates to a playing method of a gaming machine, which includes the steps of: (c1) receiving the input a bet from a bet input unit; (c2) after receiving the input of the bet, running a unit game at a predetermined timing and awarding a base payout based on a result of the unit game and a bet value of the bet; (c3) in a base game in which the unit game can be repeatedly run, accumulatively storing the bet value of the bet each time of the unit game is run; (c4) in the base game, counting how many times the unit game is run; and (c5) when a predetermined condition is met in the base game, calculating an average of the bet value bet on each of the counted unit game, based on the bet value accumulatively stored in the bet value memory, and awarding a special payout which is calculated by multiplying the average by a predetermined value.

According to this structure, awarded are not only a base payout as a result of a unit game but also a special payout when a predetermined condition is met in a base game. Furthermore, since the special payout is calculated by multiplying an average of the bet values bet in the base game by a predetermined value, a special payout is fairly awarded when a predetermined condition is met in a base game. Therefore a new entertainment characteristic is achieved.

BRIEF DESCRIPTION OF THE DRAWINGS

FIG. 5 shows a base game symbol table.

FIG. 6 shows a base game payout table.

DESCRIPTION OF THE PREFERRED EMBODIMENTS

A gaming machine and a playing method thereof of the present invention are discussed below.

Figure 1:
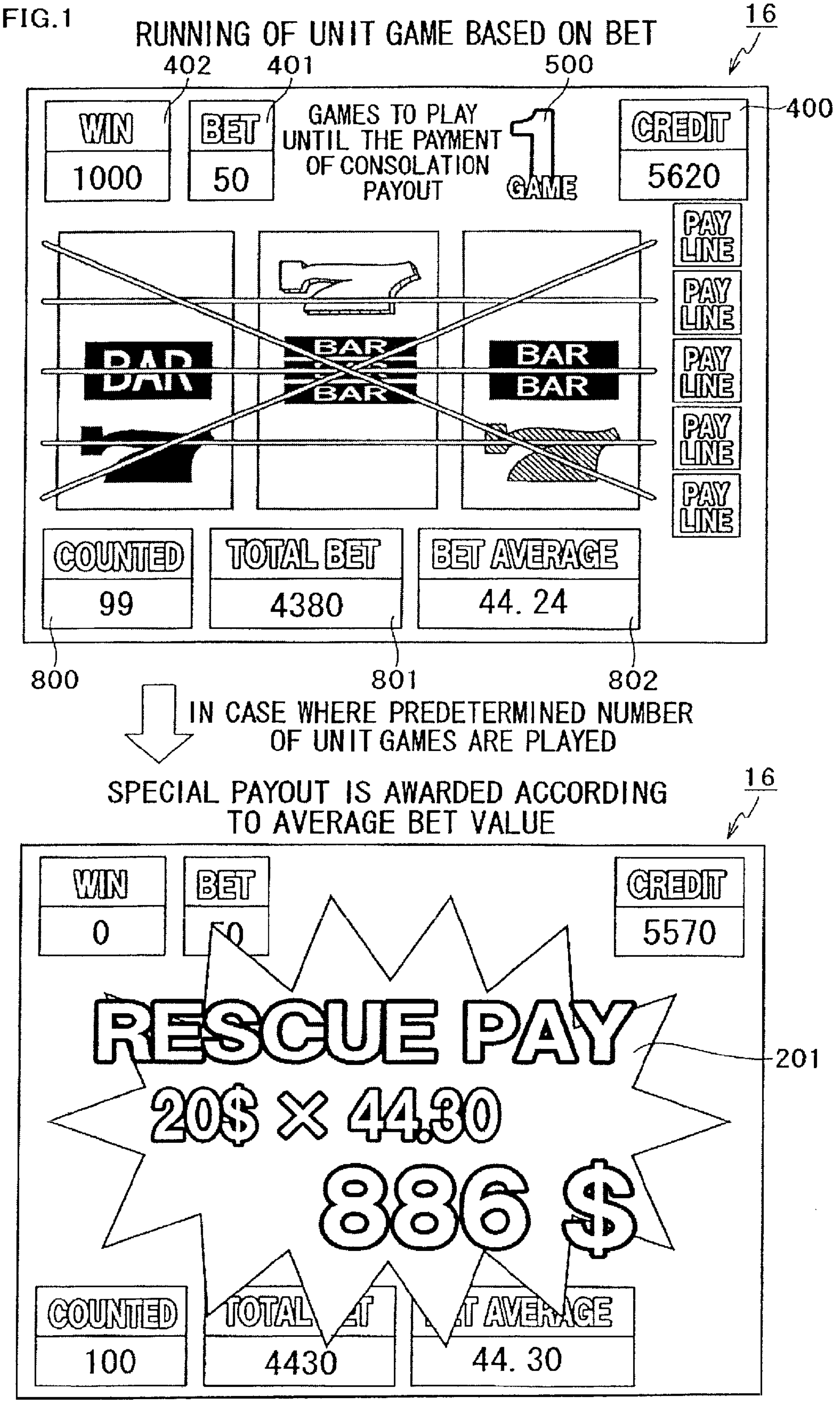
FIG. 1 illustrates a gaming machine and a playing method thereof.

As illustrated in FIG. 1, a gaming machine 10 carries out a playing method which includes the steps of: receiving a bet by a bet input unit; after receiving the bet, running a unit game at a predetermined timing and awarding a base payout based on the result of the running of the unit game and the bet value thus betted; accumulatively storing a bet value on each unit game in a base game in which unit games can be repeatedly run; counting the number of unit games run in a base game; and when a predetermined condition is met in a base game, calculating an average of the bet values betted in the counted unit games based on the accumulatively stored bet values and awarding a special payout which is calculated by multiplying the average by a predetermined value.

In the present embodiment, a base game is a slot game. A unit game is a single slot game which starts in response to a bet and a base payout is awarded according to the result. That is to say, a base game is arranged so that unit games each of which starts in response to an input of a bet can be repeatedly run. The base game is not limited to slot game. Examples of the base game include baccarat, blackjack, roulette, and various types of book games.

A bet value is an amount of game media bet on a unit game. A game medium is a coin, a bill, or electronic information equivalent to them. Other non-limiting examples of game media in the present invention include a medal, a token, electronic money, and a ticket. A non-limiting example of the ticket is a later-mentioned ticket with barcode.

Figure 2:
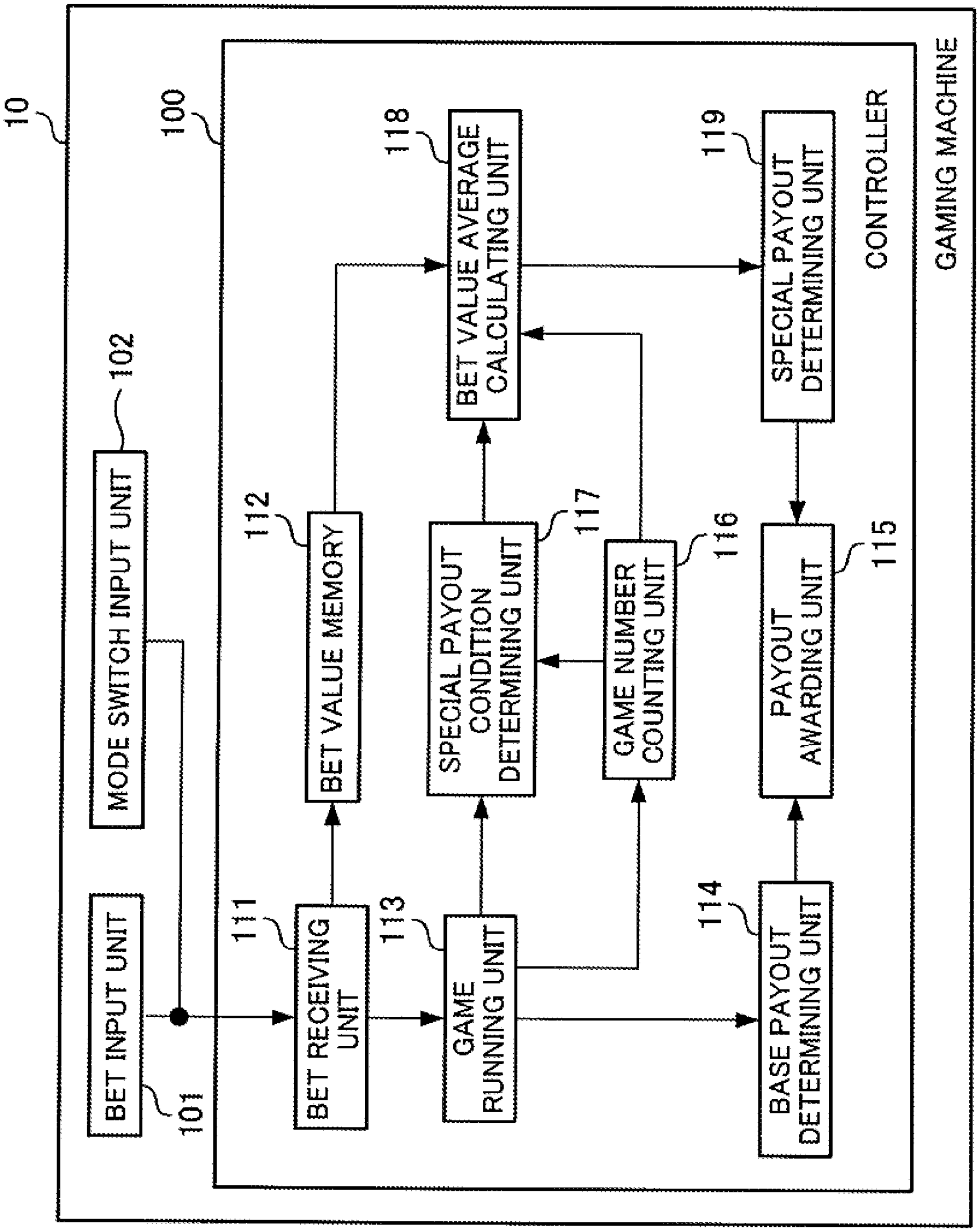
FIG. 2 is a block diagram of the gaming machine.

As illustrated in FIG. 2, the gaming machine 10 executing the above-described playing method includes a controller 100 and a bet input unit 101.

As shown in FIG. 2, the bet input unit 101 is connected to the controller 100. The bet input unit 101 has a function to output a bet signal in response to a player's operation. This bet signal is supplied to a later-described bet receiving unit 111 of the controller 100. The information indicated by a bet signal includes a bet value betted in a unit game.

(Controller 100)

The controller 100 is configured to execute: a first process of receiving a bet from the bet input unit 101; a second process of executing a unit game at a predetermined timing after receiving the bet and awarding a base payout based on the result of the unit game and the bet value which has been bet; a third process of accumulatively storing a bet value of each unit game in a base game in which unit games can be repeatedly run; a fourth process of counting the number of unit games run in the base game; and a fifth process of calculating an average of the bet values on the counted unit games based on the accumulatively stored bet value, when a predetermined condition is met in the base game, and awarding a special payout which is calculated by multiplying the average by a predetermined value. In other words, the controller 100 includes a first processing unit, a second processing unit, a third processing unit, a fourth processing unit, and a fifth processing unit.

The controller 100 includes a bet receiving unit 111, a bet value memory 112, a game running unit 113, a base payout determining unit 114, a payout awarding unit 115, a game number counting unit 116, a special payout condition determining unit 117, a bet value average calculating unit 118, and a special payout determining unit 119.

The bet receiving unit 111 receives a bet based on the bet signal supplied from the bet input unit 101. The bet value memory 112 accumulatively stores a bet value of a bet on each unit game. It is noted that bet values of respective unit games may be accumulatively stored in a single area of the bet value memory 112 or a bet value may be stored in association with each unit game.

The game running unit 113 has a function of running a unit game at predetermined timing in response to the bet and outputting a result of the unit game. In other words, the game running unit 113 runs a base game in which unit games can be repeatedly run in response to the input of a bet.

The base payout determining unit 114 determines a payout amount of a base payout to be awarded, based on the result of the unit game and the bet value of the bet. The payout awarding unit 115 awards a base payout determined by the base payout determining unit 114 and a special payout calculated by the special payout determining unit 119.

The game number counting unit 116 counts the number of unit games which are repeatedly run in a base game. The special payout condition determining unit 117 determines whether the base game run by the game running unit 113 satisfies a predetermined condition.

The bet value average calculating unit 118 calculates an average of the bet values on the respective unit games counted by the game number counting unit 116, when the special payout condition determining unit 117 determines that the base game satisfies the predetermined condition. More specifically, the bet value average calculating unit 118 calculates an average of the bet values based on the bet value accumulatively stored in the bet value memory 112 and the counted number of unit games.

The special payout determining unit 119 determines an amount of the special payout by multiplying, by a predetermined value, the average of the bet values calculated by the bet value average calculating unit 118.

It is noted that each block of the aforesaid controller 100 may be implemented as software or hardware.

(Operation of Controller 100)

How the controller 100 operates in the above-described structure is described. First, a bet is input to the bet input unit 101 by a player. In response to the input, the bet input unit 101 outputs a bet signal to the bet receiving unit 111. The bet receiving unit 111 receives the bet signal so as to receive the input of the bet. In this way the controller 100 executes the first process of receiving the input of the bet from the bet input unit 101.

Based on the bet received by the bet receiving unit 111, the game running unit 113 runs a unit game at a predetermined timing and outputs a result of the unit game. Based on this result and a bet value of the bet on the unit game, the base payout determining unit 114 determines an amount of the base payout. The payout awarding unit 115 awards the determined base payout. In this way the controller 100 executes the second process of running a unit game at a predetermined timing after receiving the input of the bet and awarding a base payout based on the result of the base game and the bet value of the bet.

The bet receiving unit 111 accumulatively stores the bet values of the received bets in the bet value memory 112. In other words, the controller 100 executes the third process of accumulatively storing the bet values on the respective unit games, in a base game in which unit games can be repeatedly run.

The game number counting unit 116 counts up the number of unit games each time the game running unit 113 runs a unit game. In other words, the controller 100 executes the fourth process of counting how many times unit games are run in a base game.

The special payout condition determining unit 117 determines, for each unit game, whether a base game run by the game running unit 113 satisfies a predetermined condition. When the special payout condition determining unit 117 has determined that the base game satisfies the predetermined condition, the bet value average calculating unit 118 calculates an average of the bet values. The special payout determining unit 119 determines an amount of special payout by multiplying, by a predetermined value, the average bet value calculated by the bet value average calculating unit 118. The payout awarding unit 115 awards the determined special payout. In this way the controller 100 executes, when a predetermined condition is met in a base game, the fifth process of calculating an average of the bet values on the counted unit games based on the accumulatively stored bet value and awarding a special payout calculated by multiplying the average by a predetermined value.

As the above-described processes clarify, the gaming machine 10 realizes a playing method including the steps of: receiving the input of a bet from the bet input unit 101; after receiving the input of the bet, running a unit game at a predetermined timing and awarding a base payout based on the result of the unit game and the bet value of the bet; in a base game in which unit games can be repeatedly run, accumulatively storing the bet values on the respective unit games; counting how many times unit games are run in the base game; and when a predetermined condition is met in the base game, calculating an average of the bet values bet on the counted unit games based on the accumulatively stored bet value, and awarding a special payout calculated by multiplying the average by a predetermined value.

According to this playing method, the input of a bet is received from the bet input unit 101. After receiving the input of the bet, a unit game is run at a predetermined timing, and a payout is awarded based on the result of the unit game and the bet value of the bet. In a base game in which unit games can be repeatedly run, the bet values on the respective unit games are accumulatively stored in the bet value memory. In the base game, how many unit games are run is counted. When a predetermined condition is met in the base game, an average of the bet values bet on the counted unit games is calculated based on the bet value accumulatively stored in the bet value memory, and a payout calculated by multiplying the average by a predetermined value is awarded.

In short, awarded are not only a base payout as a result of a unit game but also a special payout when a predetermined condition is met in a base game. Furthermore, since the special payout is calculated by multiplying an average of the bet values bet in the base game by a predetermined value, a special payout is fairly awarded when a predetermined condition is met in a base game. Therefore a new entertainment characteristic is achieved.

The fifth process executed by the controller 100 of the gaming machine 10 may be arranged so that a special payout is awarded when the number of unit games counted by the game number counting unit 116 reaches a predetermined number. In other words, the controller 100 may execute the fifth process of calculating an average of the bet values bet on the counted unit games based on the accumulatively stored bet value, when the number of unit games counted by the game number counting unit 116 reaches a predetermined value, and awarding a special payout calculated by multiplying the average by a predetermined value.

According to the above-described structure, the input of a bet is received from the bet input unit 101. After receiving the input of the bet, a unit game is run at a predetermined timing, and a payout is awarded based on the result of the unit game and the bet value of the bet. In a base game in which unit games can be repeatedly run, the bet values on the respective unit games are accumulatively stored in the bet value memory. In the base game, how many unit games are run is counted. When the counted number of unit games in the base game reaches a predetermined number, an average of the bet values bet on the counted unit games is calculated based on the bet value accumulatively stored in the bet value memory, and a payout calculated by multiplying the average by a predetermined value is awarded.

In other words, awarded are not only a base payout as a result of a unit game but also a special payout when unit games are run for a predetermined number of times in a base game. Since a special payout is awarded when the player continuously plays base games, the player is motivated to continuously play games. Furthermore, since a special payout is calculated by multiplying an average of bet values bet in a base game by a predetermined value, the special payout is fairly awarded when a predetermined condition is met in the base game. Therefore a new entertainment characteristic is achieved.

In addition to the above, as shown in FIG. 2, the gaming machine 10 may further include a mode switch input unit 102 which allows the player to switch between an insured mode and an uninsured mode, and the controller 100 may be programmed to execute the third, fourth, and fifth processes only when the insured mode is set by the mode switch input unit 102.

According to the structure above, the processes related to a special payout are executed only when the insured mode is set by the mode switch input unit 102 which can switch between the insured mode and the uninsured mode. This allows the player to play games in a desired mode and hence an entertainment characteristic is further enhanced.

For example, provided that a required bet value in the insured mode is higher than in the uninsured mode, the player can choose either the insured mode in which a special payout may be awarded while each bet value is high or the uninsured mode in which no special payout is awarded but each bet value is low.

(Mechanical Structure: Outline)

An embodiment of the present invention is specifically described. The gaming machine 10 of the present embodiment includes a lower image display panel 16 which displays various types of effect images related to a base game. The gaming machine 10 is structured so that the mode of a base game is switchable between the uninsured mode and the insured mode by operating a later-mentioned insurance mode switching button 90 which functions as the mode switch input unit (see FIG. 3).

(Uninsured Mode and Insured Mode)

In the gaming machine 10 of the present embodiment, the shift from the uninsured mode to the insured mode or from the insured mode to the uninsured mode occurs when the insurance mode switching button 90 is pressed. In other words, when the insurance mode switching button 90 is pressed, the shift to the insured mode occurs if a base game is in the uninsured mode, and the shift to the uninsured mode occurs when a base game is in the insured mode.

A unit game in the insured mode requires a larger number of game media than a unit game in the uninsured mode. In other words, to obtain the same base payout, it is necessary in the insured mode to bet a larger number of game media than in the uninsured mode. Note that, the number of unit games run in the insured mode (hereinafter, this may be referred to as the number of insured games) is counted and a special payout (hereinafter, this may be referred to as consolation payout) is awarded when the number of unit games reaches a predetermined number (100). A condition where the number of insured games reaches a predetermined number is equivalent to a condition where a predetermined condition of the present invention is met.

In this way, the player is allowed to choose either the uninsured mode in which each bet value is small and only a base payout is expected or the insured mode in which each bet value is large and both a base payout and a special payout are expected. Since the player can play with a desired mode, he/she feels less stressful and an entertainment characteristic is further enhanced.

In the present embodiment, the gaming machine 10 is structured so that the player is able to choose either the uninsured mode or the insured mode. Alternatively, the gaming machine 10 may be structured to be fixed to the insured mode.

(Special Payout)

FIG. 1 shows an example of images displayed on the later-described lower image display panel 16. The gaming machine 10 of the present embodiment (see FIG. 3) is structured so that the following types of payout can be awarded: a base payout which is awarded as a result of a bet on a unit game; and a special payout which is awarded when a predetermined condition is met in a base game in which plural unit games are run.

The special payout is discussed with reference to FIG. 1. In the gaming machine 10 of the present embodiment, the uninsured mode is shifted to the insured mode when the insurance mode switching button 90 (see FIG. 3) is pressed. In the base game after the shift to the insured mode, the number of unit games is counted. When the counted number of unit games (hereinafter, this may be referred to as the number of insured games) reaches a predetermined number (100), a special payout is awarded. A condition where the number of insured games reaches a predetermined number is equivalent to a condition where a predetermined condition of the present invention is met.

Specifically, as shown in the upper part of FIG. 1, the lower image display panel 16 displays a countdown image 500. This countdown image 500 shows a remaining number of games until the number of insured games reaches a predetermined number (100). In the example shown in the upper part of FIG. 1, the countdown image 500 shows that one game remains until the number of insured games reaches the predetermined number (100).

The upper part of FIG. 1 also shows that the lower image display panel 16 further displays an insured game number indicator 800, an accumulative bet value indicator 801, and an average bet value indicator 802. The insured game number indicator 800 indicates the number of insured games. The accumulative bet value indicator 801 indicates the accumulative value of bets. The accumulative value of bets indicates the total amount of game media bet on a base game after the shift to the insured mode. The average bet value indicator 802 indicates an average value of bets. The average value of bets is calculated by dividing the number of insured games from the accumulative value of bets. Specifically, in the example shown in the upper part of FIG. 1, the number of insured games is 99, the accumulative value of bets is 4380, and the average value of bets is 4380÷99≈44.24.

The lower part of FIG. 1 shows that an achievement effect image 201 is displayed for the reason that the number of insured games has reached the predetermined number (100). The achievement effect image 201 indicates that a special payout is awarded as consolation payout when the number of insured games reaches the predetermined number. The special payout is calculated by multiplying the average of the bet values bet on the predetermined number of (100) unit games by a predetermined value (20). In the example shown in the lower part of FIG. 1, the special payout is 20×44.30=886.

In this way, the player can expect not only a base payout as a result of a unit game but also a special payout which is awarded when a predetermined number of unit games are run in a base game. Furthermore, since a special payout is awarded as a result of continued playing of base games, the player is motivated to continue the game play. In the meanwhile, a special payout is calculated by multiplying, by a predetermined value, an average bet value of a base game. Therefore, no matter how the player places a bet, a special payout is fairly awarded when a predetermined condition is met in a base game. This provides a new entertainment characteristic.

(Running of Base Game)

Figure 4A:
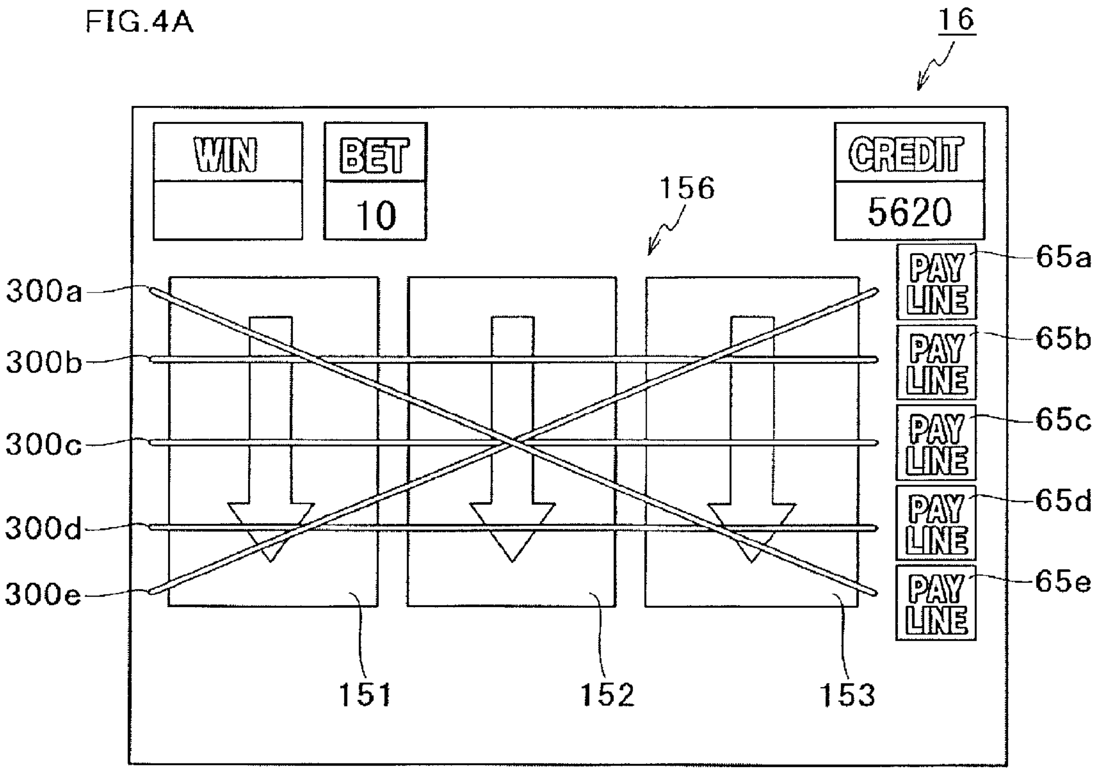
FIG. 4A illustrates an example of the display state of a lower image display panel.

Referring to FIG. 4, an example of a base game in the gaming machine 10 is discussed. As shown in FIG. 4, the discussion presupposes that the lower image display panel 16 of the gaming machine 10 arranges symbols by a video reel.

Figure 4B:
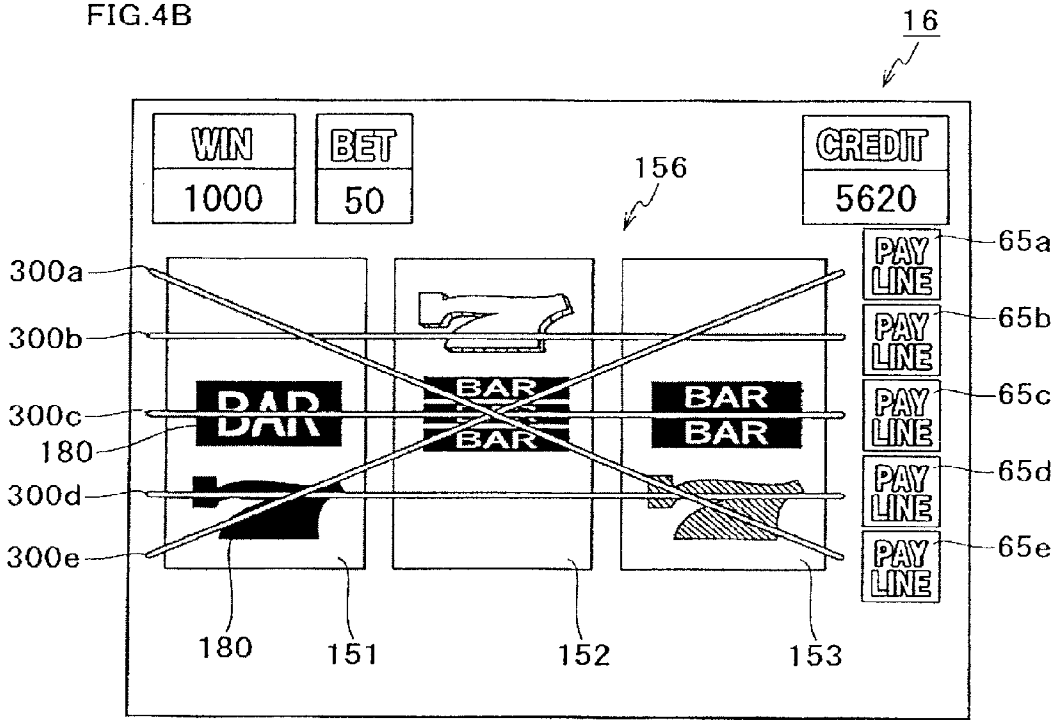
FIG. 4B illustrates an example of the display state of the lower image display panel.

As shown in FIG. 4B, a matrix 156 is arranged at the central part of the lower image display panel 16. This matrix 156 is an arrangement area where symbols are arranged and where plural symbols 180 are scroll-displayed. The display windows 151 to 153 are respectively divided into upper stages 151*a* to 153*a*, central stages 151*b* to 153*b*, and lower stages 151*c* to 153*c*. The base symbols 180 are stopped (arranged) in each of the stages 151*a* to 153*a*, 151*b* to 153*b*, and 151*c* to 153*c*. The matrix 156 is a symbol matrix made up of 3 columns and 3 rows. The matrix 156 however is not limited to the one with the three-columns and three-rows.

The "arrangement" in this embodiment means a state where the symbols 180 can be visually observed by a player. That is, as shown in FIG. 4B, "arrangement" means that the symbols 180 are displayed in the matrix 156. In the example shown in FIG. 4B, "BLANK" symbols which do not display any images are arranged in the upper stage 151*a*, the lower stage 152*c*, and the upper stage 153*a*. Therefore the player who sees the blank arrangement area of the matrix 156 is able to confirm that "BLANK" symbols 180 are arranged. Arranging the base symbols 180 again after dismissing them is referred to as "rearranging".

As shown in FIG. 9A, when a unit game starts in the gaming machine 10, plural symbols 180 are variably displayed on the lower image display panel 16. As shown in FIG. 4B, then the variable display of the symbols 180 automatically stops after a predetermined period elapses, with the result that plural symbols 180 are rearranged on the matrix 156. In other words, symbols 180 are rearranged as a result of the unit game. Thereafter it is determined whether a winning is met, in accordance with the combination of the rearranged symbols 180. If a winning is met, a base payout is awarded based on the winning and the bet value.

(Symbol, Combination, Etc.)

FIG. 5 shows a base game symbol table indicating relations among symbol columns of symbols 180 displayed on the matrix 156 of the lower image display panel 16, code numbers, and random number ranges. As shown in FIG. 5, a single symbol column is constituted by 20 symbols. Each of the symbols constituting the symbol column is assigned with a code number selected from the range of 0 to 19. Each symbol column is constituted by the following symbols: "BAR×3", "BAR×2", "BAR", "BLANK", "Red 7", "Blue 7", and "White 7". The symbols 180 rearranged in the matrix 156 are determined based on in which one of the random number ranges of the symbol column a random value generated by a later-mentioned random number generator 64 is included.

In addition, as shown in FIG. 9B, 5 pay lines are provided in accordance with 9 viewable stop positions of symbols. In other words, displayed on the lower image display panel 16 are: a top line 300*b*, a center line 300*c*, and a bottom line 300*d* each of which horizontally traverses the three symbols that are vertically aligned; and a cross-down line 300*a* and a cross-up line 300*e* each of which obliquely crosses over the symbols.

Each of these pay lines is activated in accordance with a bet value. Specifically, one pay line (only the center line 300*c*) is activated when 1 to 10 coin(s) is/are bet, two pay lines (the center line 300*c* and the top line 300*b*) are activated when 11 to 20 coins are bet, three pay lines (the center line 300*c*, the top line 300*b*, and the bottom line 300*d*) are activated when 21 to 30 coins are bet, four pay lines (the center line 300*c*, the top line 300*b*, the bottom line 300*d*, and the cross-down line 300*a*) are activated when 31 to 40 coins are bet, and five pay lines (the center line 300*c*, the top line 300*b*, the bottom line 300*d*, the cross-down line 300*a*, and the cross-up line 300*e*) are activated when 41 to 50 coins are bet. It is noted that the lower image display panel 16 displays only an activated pay line and a corresponding one of pay line images 65*a*, 65*b*, 65*c*, 65*d*, and 65*e* which indicate that the center line 300*c*, the top line 300*b*, the bottom line 300*d*, the cross-down line 300*a*, and the cross-up line 300*e* are active, respectively. In other words, a pay line image 65 is displayed only in the vicinity of a displayed pay line.

The pay lines 300*a* to 300*e* relate to the determination of whether a winning is met. Specifically, a combination of symbols 180 corresponding to a predetermined winning is rearranged on any one of activated pay lines, so that a winning is met. Referring to FIG. 6, the following describes a combination of symbols 180 with which a winning is met.

FIG. 6 shows a base game payout table. This base game payout table is used when it is determined that a winning is met in a base game and when a payout is awarded according to the winning. The base game payout table has a winning column and a payout number column. The winning column shows combinations of symbols 180, each of which combination must be rearranged on a pay line to meet a winning. The payout number column indicates the number of game media (base payout) for each bet, which is paid out when a winning is met.

The example shown in FIG. 26 is specifically described. When three symbols "BAR×3" are rearranged on a pay line, the number of payout is 60 for each bet. When three symbols "BAR×2" are rearranged on a pay line, the number of payout is 40 for each bet. When three symbols "BAR" are rearranged on a pay line, the number of payout for each bet is 20. When three symbols selected from the symbols "BAR×3", "BAR×2", and "BAR" are rearranged on a pay line, the number of payout for each bet is 10. When three symbol "BLANK" are rearranged on a pay line, the number of payout for each bet is 1. When three symbols "Red 7" are rearranged on a pay line, the number of payout for each bet is 600. When three symbols "Blue 7" are rearranged on a pay line, the number of payout for each bet is 300. When three symbols selected from the symbols “Red 7”, “Blue 7”, and “White 7” are rearranged on a pay line, the number of payout for each bet is 100.

The present invention can be adapted so that a predetermined scatter symbol is determined in advance for each symbol. A scatter symbol is such that a state advantageous for the player is achieved when a predetermined number or more of scatter symbols are displayed in the matrix 156. For example, a base game may shift to an advantageous state when three or more symbols “BONUS” are rearranged in the matrix 156. It is noted that examples of such an advantageous state include a state in which coins corresponding to scatter symbols are paid out, a state in which the number of payout of game media is added to the credit, and a state in which a bonus game starts.

The gaming machine 10 is not necessarily structured to award only the aforesaid special payout and base payout. The gaming machine 10 may be structured to additionally award another state advantageous for the player. Examples of such a state advantageous for the player include a state in which the number of obtainable game media is larger than the base game, a state in which the probability of obtaining game media is higher than the base game, and a state in which the number of consumed game media is smaller than the base game. Specific examples of the advantageous state are a free game, a second game, and a feature game. The free game is such that a predetermined number of games are playable without betting a game medium.

(Mechanical Structure: Gaming Machine 10)

Figure 3:
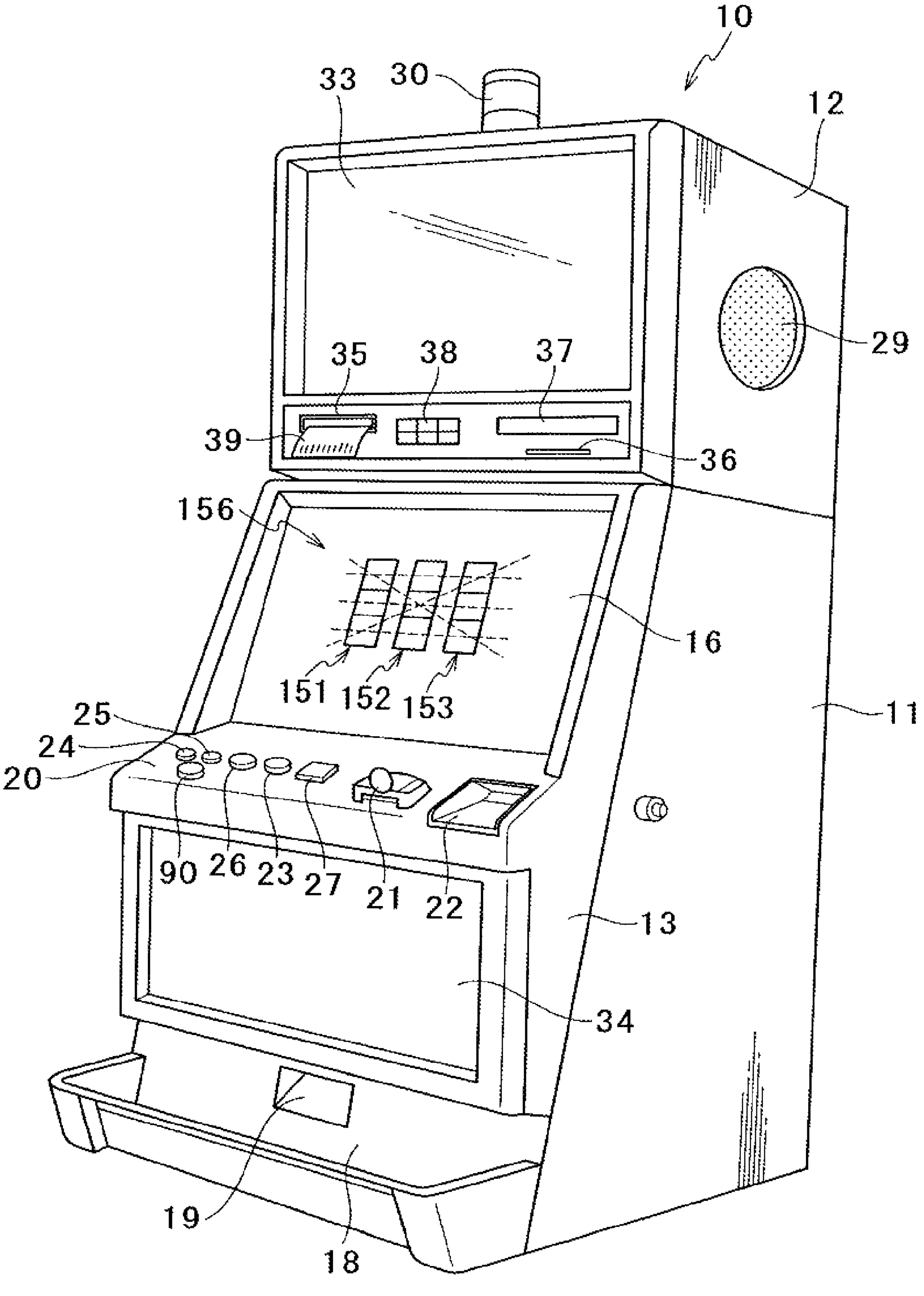
FIG. 3 is a perspective view of the external appearance of the gaming machine.

FIG. 3 is a perspective view showing the external appearance of the gaming machine 10 of an embodiment of the present invention. The gaming machine 10 includes a cabinet 11, a top box 12 provided above the cabinet 11, and a main door 13 provided on the front surface of the cabinet 11.

The main door 13 is provided with the lower image display panel 16. The lower image display panel 16 has a transparent liquid crystal panel and displays plural arrangement areas forming a 3×3 matrix. Each arrangement area displays a single symbol.

The present embodiment presupposes that the gaming machine 10 is a so-called video slot machine. The slot machine of the present invention, however, may be structured to display and stop symbols by mechanical reel. It is also noted that the lower image display panel 16 displays various not-shown images concerning effects, in addition to the aforesaid images.

On the front surface of the lower image display panel 16, an unillustrated touch panel 69 is provided. The player can input various types of instructions by operating the touch panel 69. As the touch panel 69 is operated, an input signal is transmitted from the touch panel 69 to the main CPU 41.

Provided below the lower image display panel 16 are a control panel 20 constituted by buttons 23 to 27 and 90 by which the player inputs instructions concerning the game progress, a coin receiving slot 21 which allows a coin to be inserted into the cabinet 11, and a bill validator 22.

The control panel 20 has a start button 23, a change button 24, a cashout button 25, a 1-BET button 26, a maximum BET button 27, and an insurance mode switching button 90. The start button 23 is used for inputting an instruction to start the scroll of symbols. The change button 24 is used to ask a staff person of the gaming facility for money exchange. The cashout button 25 is for inputting an instruction to pay out coins corresponding to the total credit into a coin tray 18.

The 1-BET button 26 is for inputting an instruction to bet, on a game, one coin among coins corresponding to the credit. The maximum BET button 27 is for inputting an instruction to bet, on a game, the maximum number of coins bettable on one game (e.g., fifty coins in this embodiment) among coins corresponding to the credit. The insurance mode switching button 90 is for inputting an instruction to shift from the uninsured mode to the insured mode.

The 1-BET button 26 and the maximum BET button 27 constitute a bet input unit of the present invention. The bet input unit of the present invention, however, is not limited to the buttons. The bet input unit of the present invention may be a touch panel, for example.

The bill validator 22 validates whether a bill is genuine or not and receives the genuine bill into the cabinet 11. Note that the bill validator 22 may be capable of reading a barcoded ticket 39 which will be described later. On a lower front surface of the main door 13, that is, below the control panel 20, a belly glass 34 is provided. On this belly glass 34 a character of the gaming machine 10 or the like is drawn.

On a front surface of the top box 12 is provided an upper image display panel 33. The upper image display panel 33 has a liquid crystal panel, and displays an image representing game introduction or game rules, or the like.

The top box 12 is further provided with a speaker 29. Provided below the upper image display panel 33 are a ticket printer 35, a card reader 36, a data displayer 37, and a keypad 38. The ticket printer 35 prints, on to a ticket, a barcode which is an encoded form of data such as a credit-value, date and time, identification number of the gaming machine 10, and the like. The player can play a game in another slot machine using the barcoded ticket 39 having the barcode, or can exchange the barcoded ticket 39 having the barcode with a bill or the like at a predetermined place in the gaming facility, such as a change booth of the casino.

The card reader 36 reads and writes data from and into a smart card. The smart card is carried by a player, and stores therein data for identifying the player and data relating to a history of games played by the player, for example. The smart card may store data of coins, bills, credit, or the like. In place of the smart card, a magnetic stripe card may be used. The data displayer 37 is constituted by a fluorescent display and the like and displays, for example, data read out by the card reader 36 and data input by the player through the keypad 38. The keypad 38 is for inputting an instruction and data regarding the issuance of a ticket or the like.

Figure 7:
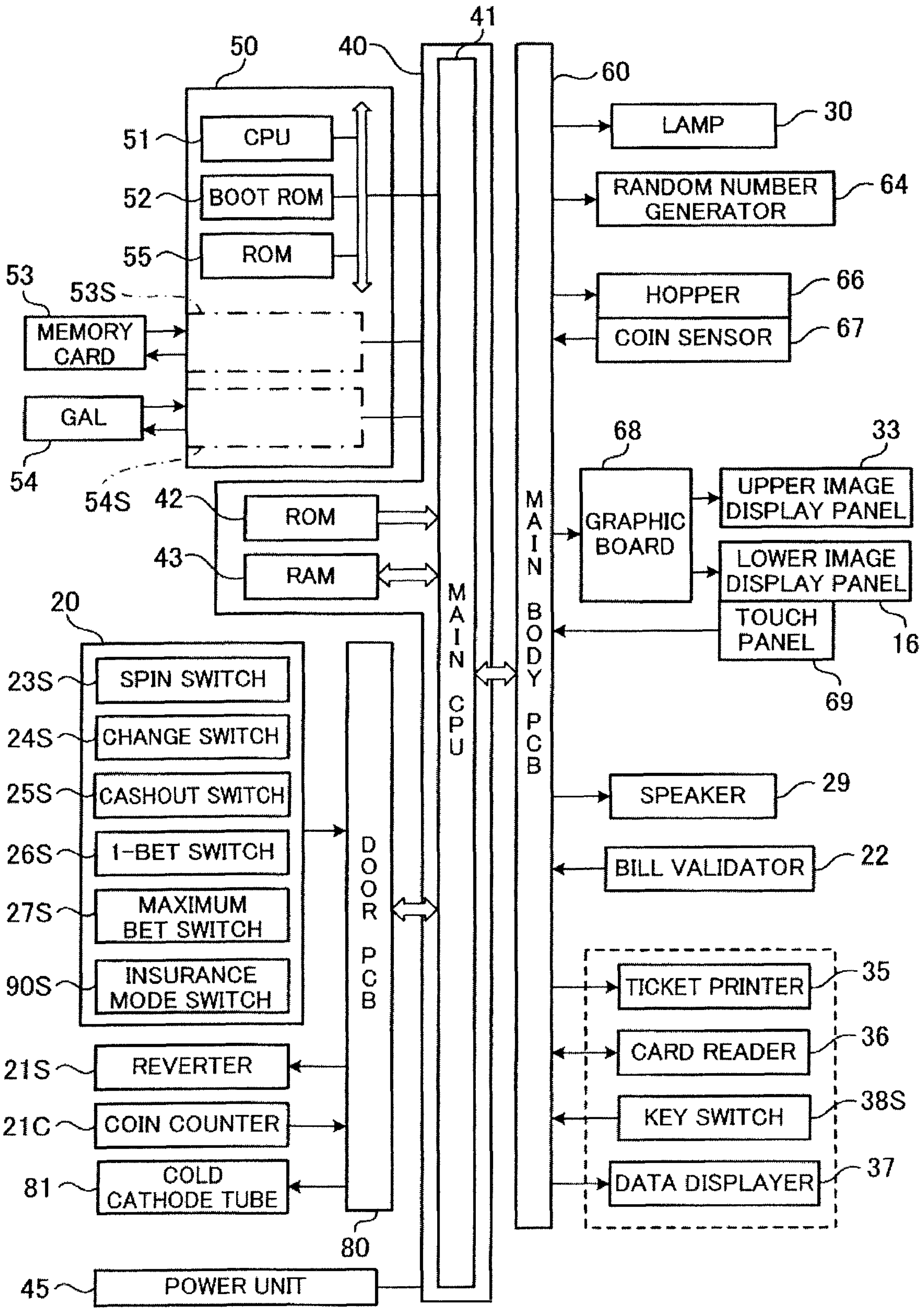
FIG. 7 is a block diagram showing the electric structure of the gaming machine.

FIG. 7 is a block diagram of the internal structure of the slot machine of FIG. 3. The gaming board 50 has a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is constituted by a non-volatile memory such as compact flash (registered trademark) and stores therein a game program. The game program contains a symbol determining program. The symbol determining program determines symbols to be rearranged on the display block 28.

The card slot 53S is structured so as to allow the memory card 53 to be attached and detached to and from the card slot 53S. This card slot 53S is connected to the motherboard 40 through an IDE bus. Thus, a type and contents of a game run at the gaming machine 10 can be changed by detaching the memory card 53 from the card slot 53S, writing a different game program into the memory card 53, and inserting the memory card 53 back into the card slot 53S. The game program includes a program relating to a game progress. The game program also includes data of images and sounds to be output during a game.

The CPU 51, the ROM 55, and the boot ROM 52 connected to one another through the internal bus are connected to the motherboard 40 through a PCI bus. The PCI bus communicates signals between the motherboard 40 and the gaming board 50, and supplies power from the motherboard 40 to the gaming board 50.

The motherboard 40 is structured by using a commercially-available general-purpose mother board (printed-wiring board on which basic components of a personal computer are mounted) and has a main CPU 41, a ROM (Read Only Memory) 42, and a RAM (Random Access Memory) 43. Note that the motherboard 40 corresponds to the controller of the present invention.

The ROM 42 is constituted by a memory device such as flash memory and stores a program such as BIOS (Basic Input/Output System) run by the main CPU 41, and permanently-used data. When the BIOS is run by the main CPU 41, an initialization process is executed so that a predetermined peripheral devices is initialized, and a readout process is executed so that the game program stored in the memory card 53 is read out through the gaming board 50. In the present invention, the ROM 42 may be rewritable or non-rewritable.

The RAM 43 stores data for the operation of the main CPU 41 and a program such as a symbol determining program, for example. The RAM 43 can also store a game program.

The RAM 43 stores data such as a credit-value, a bet value on one unit game, and a payout number. The RAM 43 also stores a total bet value, the number of games, an average bet value, and the like. In other words, the RAM 43 functions as a bet value memory which accumulatively stores bet values on respective bets.

The RAM 43 is provided with an insured game number storage area, an accumulated bet value storage area, and an average bet value storage area. Stored in the insured game number storage area is insured game number data which indicates the number of insured games. Stored in the accumulated bet value storage area is accumulated bet value data which indicates the accumulative value of bets. Stored in the average bet value storage area is average bet value data which indicates the average value of bets.

The RAM 43 is further provided with a storage area for an insurance flag. This insurance flag is set when the insurance mode switching button 90 is pressed. The storage area for the insurance flag is, for example, made up of a predetermined number of bits and the insurance flag is switched on and off in accordance with the content stored in the storage area. The mode in which the insurance flag is switched on is equivalent to the insured mode. The state in which the insurance flag is switched off is equivalent to the uninsured mode.

The motherboard 40 is connected to a later-mentioned main body PCB (Printed Circuit Board) 60 and a door PCB 80 by USB. The motherboard 40 is further connected with a power supply unit 45.

The main body PCB 60 and the door PCB 80 are connected with a device and equipment which generate an input signal to the main CPU 41 and a device and equipment which are controlled by a control signal output from the main CPU 41. Based on the input signal to the main CPU 41, the main CPU 41 executes a game program stored in the RAM 43 so as to perform a predetermined arithmetic process and stores the result of the process in the RAM 43 and performs a process of controlling each equipment and device by transmitting a control signal thereto.

The main body PCB 60 is connected to a lamp 30, a hopper 66, a coin sensor 67, a graphic board 68, a speaker 29, a touch panel 69, a bill validator 22, a ticket printer 35, a card reader 36, a key switch 38S, a data displayer 37, and a random number generator 64. The lamp 30 is turned on/off in accordance with a predetermined pattern, based on a control signal output from the main CPU 41. In the present embodiment, a random number is generated by the random number generator 64 which outputs a so-called a hardware random number. However, not limited to this, a random number may be a so-called software random number generated by a program.

The hopper 66 is mounted within the cabinet 11 and pays out a predetermined number of coins through a coin outlet 19 into the coin tray 18, based on a control signal output from the main CPU 41. The coin sensor 67 is provided inside the coin outlet 19. When the coin sensor 67 senses that a predetermined number of coins have been delivered from the coin outlet 19, the coin sensor 67 outputs a signal to be input to the main CPU 41.

The graphic board 68 controls image display on the upper image display panel 33 and the lower image display panel 16, based on a control signal output from the main CPU 41. In the symbol arrangement area of the lower image display panel 16 displayed is symbols which are scrolled and stopped. The credit value indicator 400 of the lower image display panel 16 displays the credit value stored in the RAM 43. The bet value indicator 401 of the lower image display panel 16 displays the number of betted coins. The payout indicator 402 of the lower image display panel 16 displays the number of coins to be paid out.

In addition to the above, the graphic board 68 is provided with a VDP (Video Display Processor) for generating image data based on a control signal output from the main CPU 41, a video RAM for temporarily storing the image data generated by the VDP, and the like. Note that image data used at the time when the VDP generates the image data are included in the game program which has been read out from the memory card 53 and stored in the RAM 43.

The bill validator 22 validates a bill and takes only one recognized to be genuine into the cabinet 11. When taking in a genuine bill, the bill validator 22 outputs, to the main CPU 41, an input signal based on a value of the bill. The main CPU 41 stores into the RAN 43 a credit value equivalent to the value of the bill indicated by the signal.

Based on a control signal output from the main CPU 41, the ticket printer 35 prints, onto a ticket, a barcode which is an encoded form of data such as a credit value stored in the RAM 43, date and time, identification number of the gaming machine 10, and the like. As a result, the ticket printer 35 issues a barcoded ticket 39.

The card reader 36 reads data from a smart card and transmits the data to the main CPU 41, and writes data into the smart card based on a control signal from the main CPU 41. The key switch 38S is mounted to the keypad 38, and outputs a predetermined signal to the main CPU 41 in response to a player's operation on the keypad 38. The data displayer 37 displays, based on a control signal output from the main CPU 41, data read by the card reader 36 or data input by the player through the keypad 38.

The random number generator 64 generates a random number at a predetermined timing. Random numbers generated by the random number generator 64 fall within the range of 0 to 65535.

The door PCB 80 is connected to a control panel 20, a reverter 21S, a coin counter 21C, and a cold cathode tube 81. The control panel 20 is provided with: a start switch 23S associated with the start button 23; a change switch 24S associated with the change button 24; a cashout switch 25S associated with the cashout button 25; a 1-BET switch 26S associated with the 1-BET button 26; a maximum BET switch 27S associated with the maximum BET button 27; and an insurance mode switch 90S associated with the insurance mode switching button 90. These switches 23S to 27S and 90S output a signal to the main CPU 41 when the corresponding buttons 23 to 27 and 90 are pressed by the player.

The coin counter 21C is provided within the coin receiving slot 21, and identifies whether a coin inserted into the coin receiving slot 21 by the player is genuine. A coin other than a genuine coin is discharged from the coin outlet 19. The coin counter 21C outputs an input signal to the main CPU 41 upon detection of a genuine coin.

The reverter 21S is operated based on a control signal output from the main CPU 41. The reverter 21S distributes a coin, which the coin counter 21C has recognized as a genuine coin, to the hopper 66 or a cash box (not shown) mounted in the gaming machine 10. In other words, when the hopper 66 is full of coins, a genuine coin is distributed into the cash box by the reverter 21S. On the other hand, when the hopper 66 is not yet full of coins, a genuine coin is distributed into the hopper 66. The cold cathode tube 81 functions as a backlight mounted to the rear side of the lower image display panel 16 and the rear side of the upper image display panel 33. The cold cathode tube 81 turns on based on a control signal output from the main CPU 41.

(Processing of Gaming Machine 10: Base Game Running Process)

Figure 8:
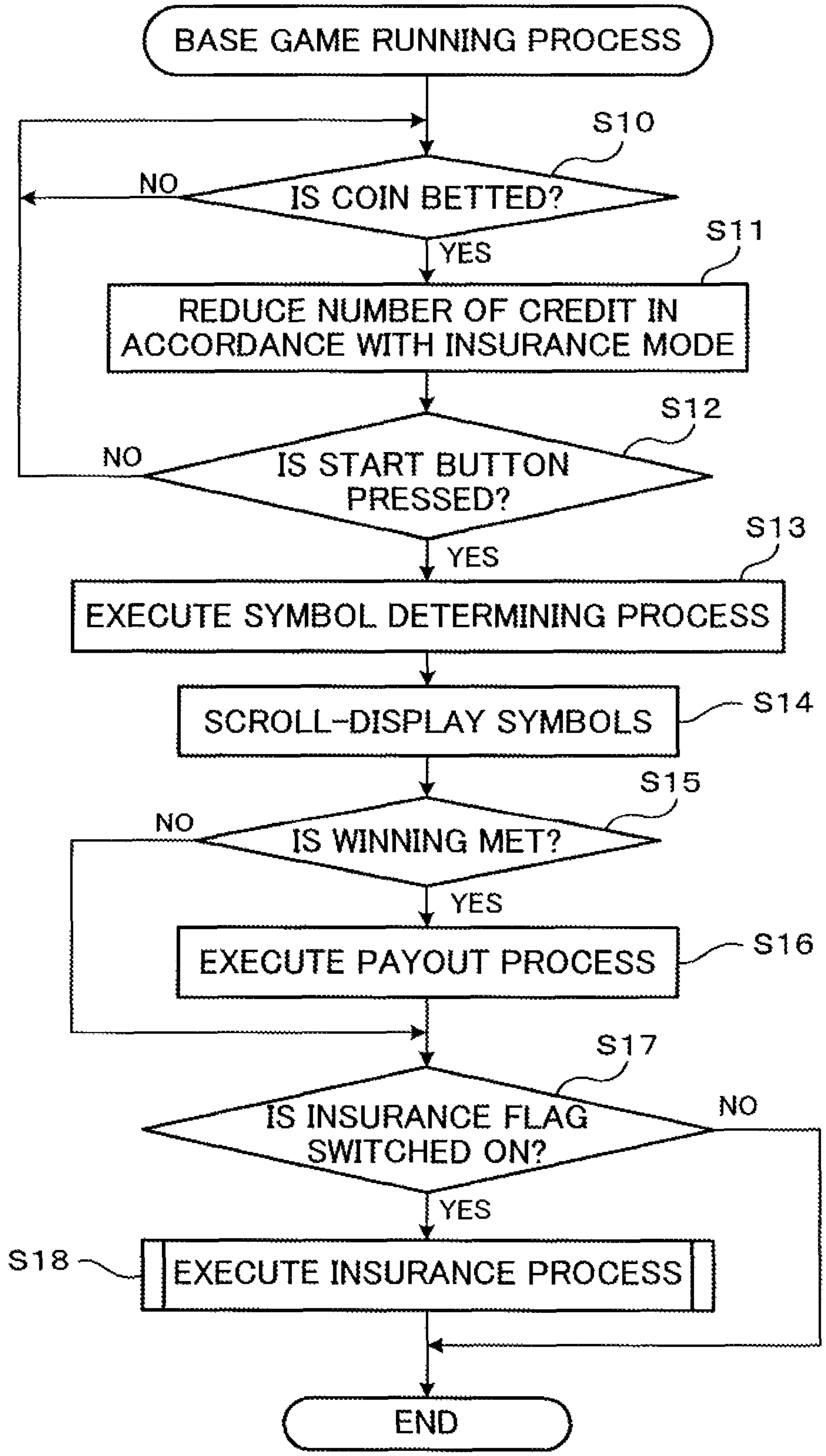
FIG. 8 is a flowchart of a base game running process executed by the gaming machine.

Referring to FIG. 8, the following explains how the gaming machine 10 having the above-described structure operates in a base game. FIG. 5 is a flowchart of a base game running process executed by the main CPU 41.

First, the main CPU 41 determines whether a coin is bet (step S10). In this step, the main CPU 41 determines whether an input signal is received. The input signal is output either from the 1-BET switch 26S when the 1-BET button 26 is pressed or from the maximum BET switch 27S when the maximum BET button 27 is pressed. If it is determined that no coin is bet, the process returns to the step S10.

If it is determined in the step S10 that a game medium is bet, the main CPU 41 reduces the credit value stored in the RAM 43, in accordance with the number of betted game media (step S11). When the number of betted game media is larger than the credit value stored in the RAM 43, the process returns to the step S10 without performing the step of reducing the credit value stored in the RAM 43. If the number of betted game media exceeds the maximum bettable number (50 in this embodiment) of game media on each game, the process proceeds to the step S12 without performing the step of reducing the credit value stored in the RAM 43.

The credit value reduced in the step S11 corresponds to the mode of insurance. Specifically, when the base game is in the uninsured mode, the credit value equivalent to the number of betted media is reduced. On the other hand, when the base game in the insured mode, the credit value to be reduced is equal to the result of adding 2 to the number of betted game media.

Thereafter, the main CPU 41 determines whether the start button 23 is pressed (step S12). In this step, the main CPU 41 determines whether an input signal which is output from the start switch 23S when the start button 23 is pressed is received.

If it is determined that the start button 23 is not pressed, the process returns to the step S10. It is noted that the main CPU 41 cancels the reduction result of the step S11 when the start button 23 is not pressed (i.e. when an instruction to end the game without the start button 23 being pressed is input).

In the meanwhile, if it is determined in the step S12 that the start button 23 is pressed, the main CPU 41 executes a symbol determining process (step S13). In the symbol determining process, the main CPU 91 runs a symbol determining program (not illustrated) stored in the RAM 43 so as to determine the code number corresponding to the stopped symbols. More specifically, a random number is obtained and a code number at the time of the rearrangement of the symbols in each symbol column displayed in the matrix 156 is determined, based on the obtained random number and a random number range corresponding to each code number.

Subsequently, in the step S14 the main CPU 41 executes a scroll display control process. In this process, the display control is performed in such a way that the symbols determined in the step S13 are rearranged after the scroll of the symbols is started.

Then the main CPU 41 determines whether a winning is met (step S15). In the step S15, the main CPU 41 determines, for each activated pay line 300, whether the symbols 180 rearranged on the pay line 300 in the step S14 form a combination with which a winning is met.

If it is determined that a winning is met, the main CPU 41 executes a process regarding the payout of game media (step S16). In this process, the main CPU 41 refers to the base game payout table (see FIG. 6) stored in the RAM 43 and determines the number of payout as a base payout, based on the winning achieved by the symbols 180 rearranged on the activated pay line 300.

If the game media are deposited in the step S16, the main CPU 41 executes in the RAM 43 a process of increasing the credit value by a value equivalent to the determined number of base payout. On the other hand, if the game media are to be paid out, the main CPU 41 transmits a control signal to the hopper 66 so as to pay out the game media equivalent to the determined number of base payout.

Either if it is determined in the step S15 that no winning is met or if the step S16 has been executed, the main CPU 41 determines whether an insurance flag is switched on (step S17). The insurance flag is switched on and off as the insurance mode switching button 90 is pressed. Switching the insurance flag on or off causes the base game to be in the insured mode or the uninsured mode. The shift of the mode of insurance will be discussed later with reference to FIG. 10.

If it is determined in the step S17 that the insurance flag is not switched on, the main CPU 41 terminates the routine. On the other hand, if it is determined that the insurance flag is switched on, the main CPU 41 executes an insurance process (step S18). This insurance process will be detailed later with reference to FIG. 9. After the step S18, the main CPU 41 terminates the routine.

(Processing of Gaming Machine 10: Insurance Process)

The insurance process executed by the main CPU 41 is described with reference to the flowchart of FIG. 9. This insurance process is a sub routine called by the base game running process and is executed when the base game is set in the insured mode.

First, the main CPU 41 updates the accumulated bet value (step S100). More specifically, a bet value betted in each unit game is accumulatively added to the accumulated bet value stored in the RAM 43, and the main CPU 41 increments the number of games by 1 (step S101). Specifically, the number calculated by adding 1 to the stored number of games is stored in the RAM 43. Thereafter an average bet value is calculated (step S102). Specifically, the average bet value is calculated by dividing the accumulated bet value, which is accumulatively stored, by the number of games. Although not illustrated, the display on each of the insured game number indicator 800, the accumulative bet value indicator 801, and the average bet value indicator 802 are updated based on the incremented number of games, the updated accumulated bet value, and the calculated average bet value.

The main CPU 41 then determines whether the number of games is equal to a predetermined number (step S103). Specifically, it is determined whether the number of games incremented in the step S101 is equal to a predetermined number (100 in the present embodiment). If it is determined that the number of games is not equal to the predetermined number, the routine is terminated.

On the other hand, if it is determined in the step S103 that the number of games is equal to the predetermined number, the number of special payout is calculated (step S104). Specifically, the average bet value calculated in the step S102 is multiplied by a predetermined number (20 in the present embodiment) so that a special payout is calculated. Then a special payout image including an achievement effect image 201 is displayed (see the lower part of FIG. 1).

The main CPU 41 awards the calculated special payout (step S106) and resets the accumulated bet value stored in the RAM 43, resets the number of games to zero and terminates the routine.

(Processing of Gaming Machine 10: Insurance Mode Shifting Process)

Figure 10:
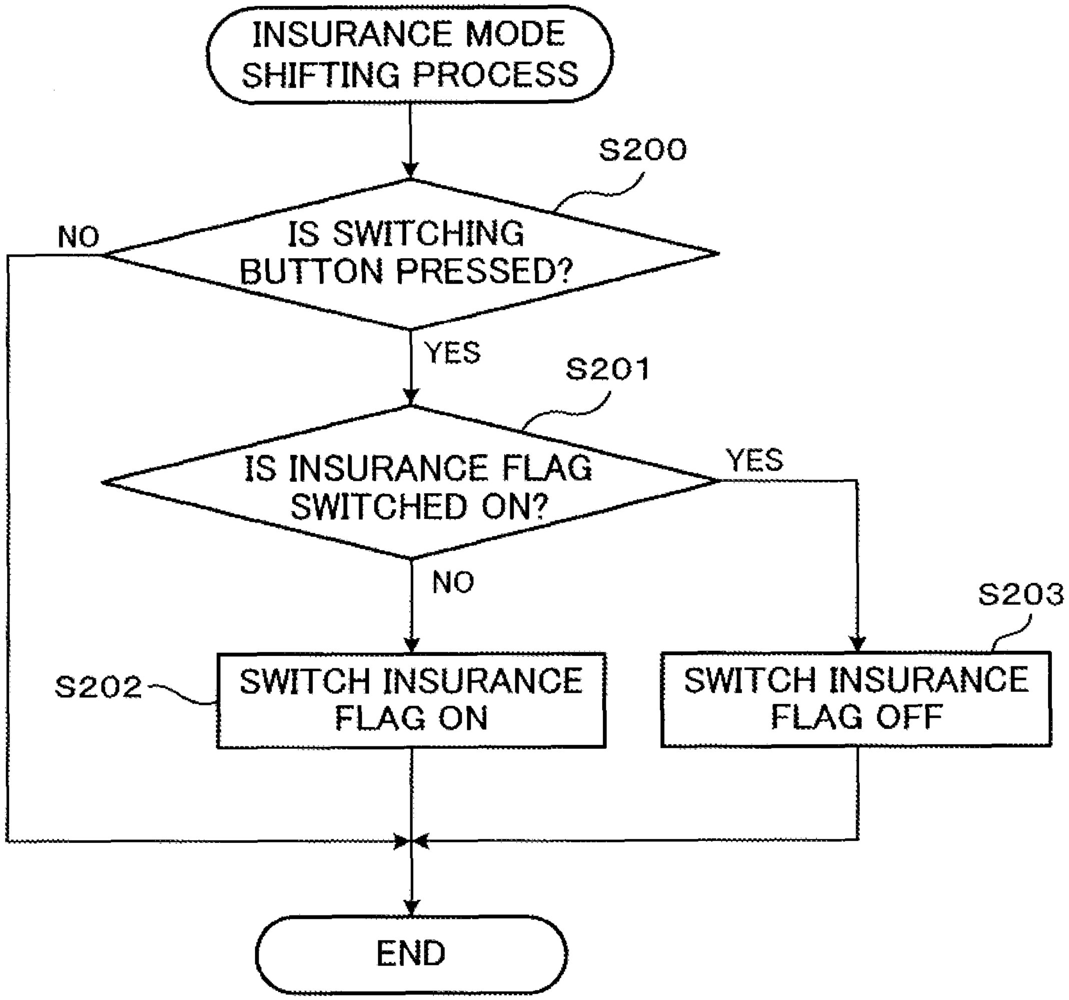
FIG. 10 is a flowchart of an insurance mode shifting process executed by the gaming machine.

Referring to the flowchart of FIG. 10, an insurance mode shifting process executed by the main CPU 41 is discussed. The insurance mode shifting process is a routine for switching the mode of insurance as the insurance mode switching button 90 is operated.

First, the main CPU 41 determines whether the insurance mode switching button 90 is operated (step S200). In this step. the main CPU 41 determines whether an input signal is received which is output from the insurance mode switch 90S when the insurance mode switching button 90 is pressed. When it is determined that the insurance mode switching button 90 is not operated, the main CPU 41 terminates this sub routine.

On the other hand, if it is determined that the insurance mode switching button 90 is pressed, the main CPU 41 determines whether the insurance flag stored in the RAM 43 is switched on (step S201). If it is determined that the insurance flag is switched on, the main CPU 41 sets the insurance flag in the on-state (step S202) and terminates the routine. On the other hand, if it is determined that the insurance flag is not switched on, the main CPU 41 sets the insurance flag in the off-state (step S203) and terminates the routine.

In this way, the gaming machine 10 receives an input of a bet as a result of the operation of the 1-BET button 26, the maximum BET button 27, or the like. After receiving the input of the bet, the start button 23 is pressed so that a single slot game which is a unit game is run, and a payout is awarded according to the betted amount. In a base game in which unit games can be repeatedly played, a bet value is accumulatively stored in the RAM 43 each time a unit game is run. In a base game, the number of unit games is counted in such a way that the number of games stored in the RAM 43 is incremented each time a unit game is run. When a predetermined condition is met in a base game, an average of bet values bet on respective counted unit games is calculated by dividing the accumulated bet value stored in the RAM 43 by the number of games, and a payout amount calculated by multiplying the average by a predetermined value is awarded.

That is to say, the player may be awarded not only a base payout as a result of a unit game but also a special payout when a predetermined condition is met in a base game. Furthermore, since the special payout is calculated by multiplying an average of bet values in the base game by a predetermined value, the special payout is fairly awarded when the predetermined condition is met in a base game. This provides a new entertainment characteristic.

Furthermore, the gaming machine 10 is arranged so that a special payout is awarded when the number of unit games counted in a base game reaches a predetermined number. In other words, since a special payout is awarded as a result of continued playing of base games, the player is motivated to continue the game play.

Furthermore, the gaming machine 10 is arranged so that the processes regarding a special payout are executed only when the insured mode is set by the insurance mode switching button 90 which can switch between the insured mode and the uninsured mode. This allows the player to play games in a desired mode and hence an entertainment characteristic is further enhanced.

In the present embodiment, the player is allowed to choose either the uninsured mode in which each bet value is small and only a base payout is expected or the insured mode in which each bet value is larger than the uninsured mode and both a base payout and a special payout are expected. This makes it possible to enhance the entertainment characteristic.

(Processing of Gaming Machine 10: Boot Process)

Figure 11:
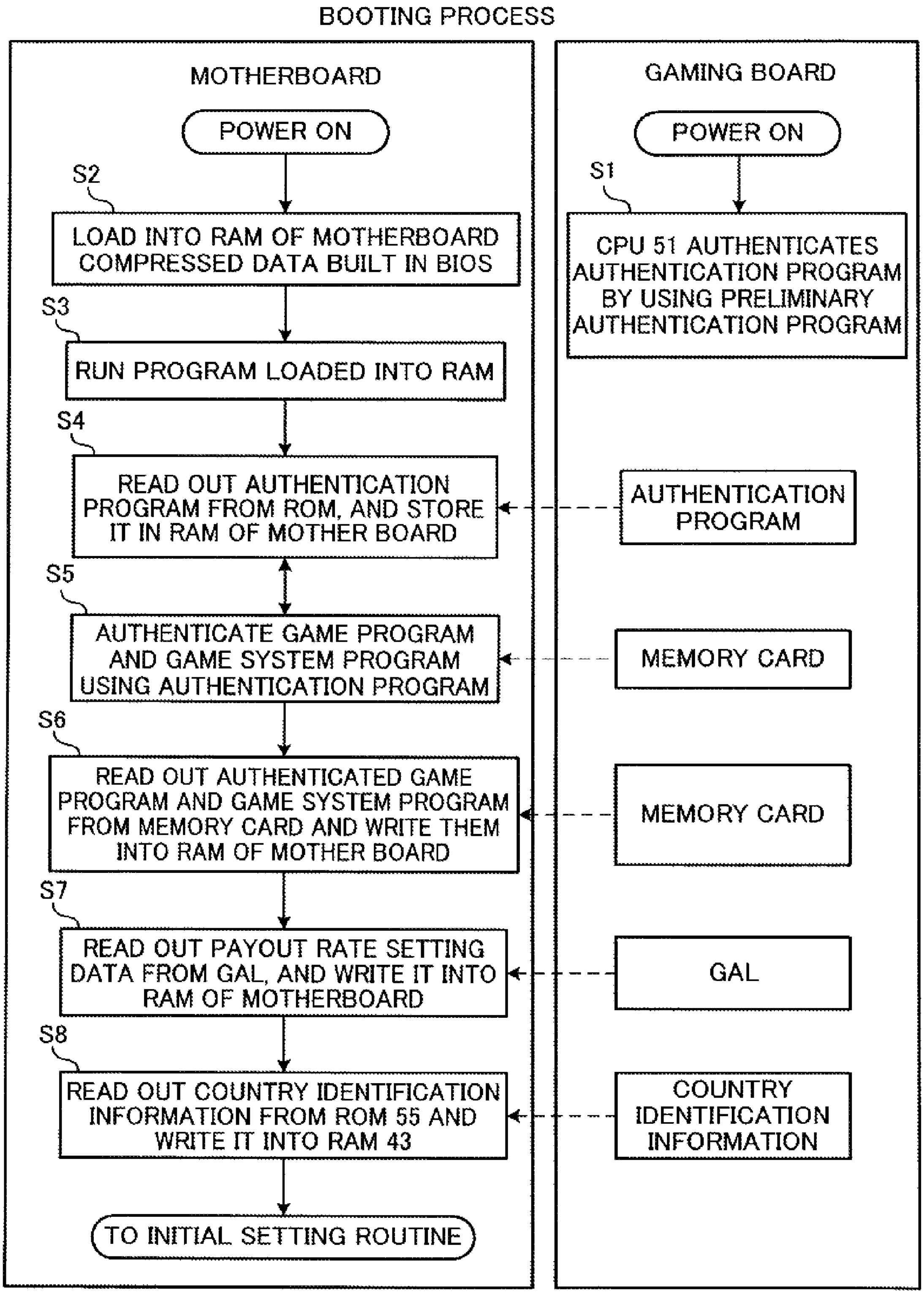
FIG. 11 is a flowchart of a boot process executed by the gaming machine.

Upon the power on, the main CPU 41 of the slot machine 1 executes a boot process routine shown in FIG. 11. This boot process is executed by the motherboard 40 and the gaming board 50. The process assumes that the memory card 53 is inserted into the card slot 53S of the gaming board 50 and the GAL 54 is attached to the IC socket 54S.

First, upon the power on, i.e. when the power switch of the power supply unit 45 is switched on, the motherboard 40 and the gaming board 50 are activated. When the motherboard 40 and the gaming board 50 are activated, different processes are simultaneously executed. That is to say, in the gaming board 50, the CPU 51 reads out a preliminary authentication program from the boot ROM 52, and performs preliminary authentication in which whether the falsification of the authentication program is not performed is confirmed and verified before the readout to the motherboard 40, in accordance with the preliminary authentication program thus read out (step S1). On the other hand, in the motherboard 40, the main CPU 41 runs the BIOS stored in the ROM 42 so as to develop in the RAM 43 the compressed data incorporated into the BIOS (step S2). Then the main CPU 41 runs the BIOS developed in the RAM 43, so as to diagnose and initialize various peripheral devices (step S3).

The main CPU 41 is connected to the ROM 55 of the gaming board 50 via the PCI bus. For this reason the main CPU 41 executes a process of reading out an authentication program from the ROM 55 and storing the authentication program in the RAM 43 (step S4). In doing so, the main CPU 41 derives a checksum through ADDSUM method (a standard check function) which is adopted in a standard BIOS, and stores the authentication program into RAM 43 while confirming if the operation of storing is carried out without an error.

Next, the main CPU 41 checks what is connected to the IDE bus. Then, the main CPU 41 accesses, via the IDE bus, to the memory card 53 inserted into the card slot 53S, and reads out a game program and a game system program from the memory card 53. In this case, the main CPU 41 reads out four bytes of data constituting the game program and the game system program at one time. Next, in accordance with the authentication program stored in the RAM 43, the main CPU 41 authenticates the game program and the game system program read out, to confirm and prove that these programs are not modified (step S5).

When the authentication process properly ends, the main CPU 41 writes and stores the authenticated game program and game system program into the RAM 43 (step S6).

Next, the main CPU 41 accesses, via the PCI bus, to the GAL 54 attached to the IC socket 54S, and reads out payout rate setting data from the GAL 54. The data read out is then written and stored in the RAM 43 (step S7).

Next, the main CPU 41 reads out, via the PCI bus, country identification information stored in the ROM 55 of the gaming board 50. The country identification information read out is then written and stored in the RAM 43 (step S8).

Figure 12:
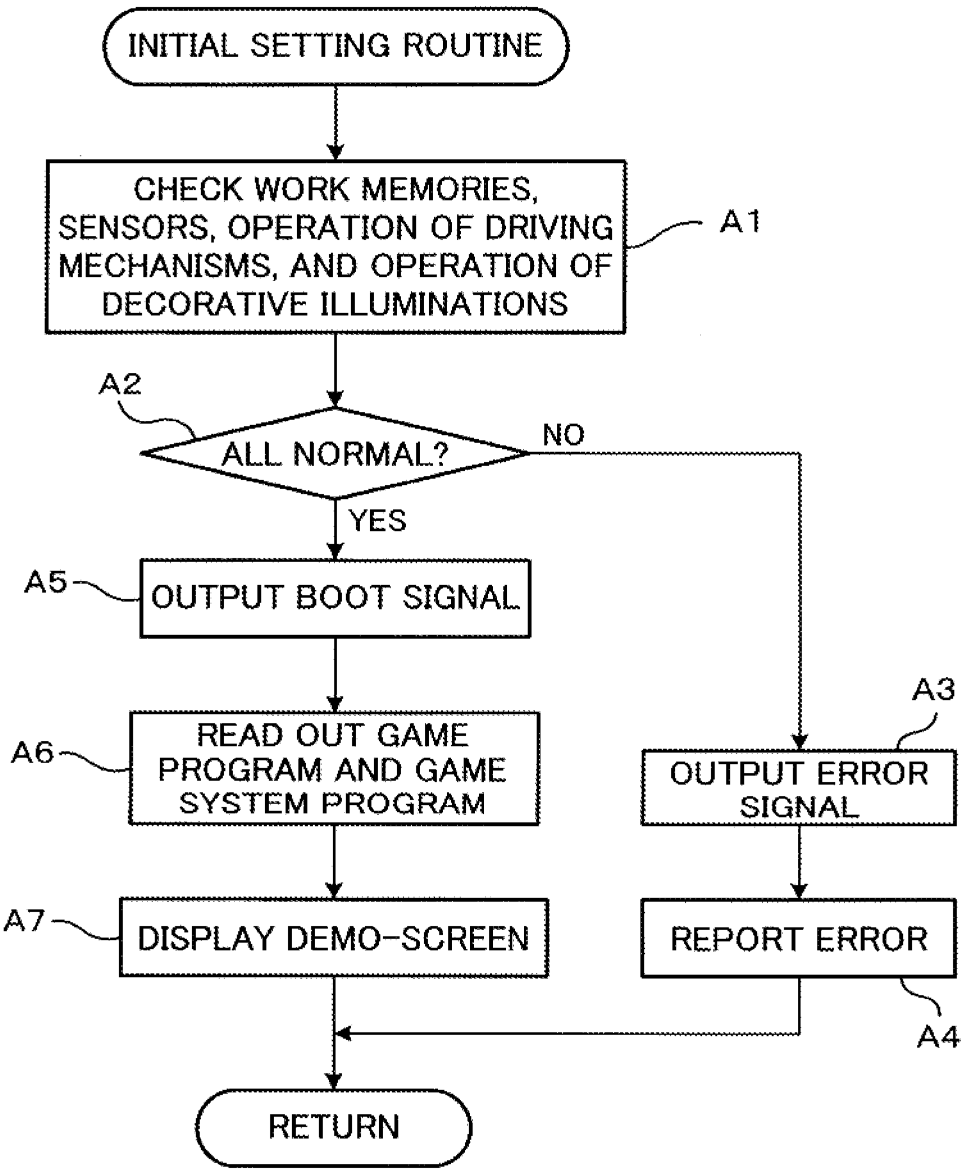
FIG. 12 is a flowchart of an initial process executed by the gaming machine.

After the step above, the main CPU 41 executes an initial process shown in FIG. 12 by serially reading out the game program and the game system program.

(Processing of Gaming Machine 10: Initial Process)

The following describes an initial process which takes place in the gaming machine 1. After the boot process shown in FIG. 11 is completed, an initial setting routine illustrated in FIG. 12 is read out from the RAM 43 and executed by the main CPU 41.

First, the main CPU 41 checks operations of work memories such as the RAM 43, various sensors, various driving mechanisms, and various decorative illuminations (step A1). Then, the main CPU 41 determines if all the check results are normal (step A2). When the main CPU 41 determines that the check results are not all normal (A2: NO), the main CPU 41 outputs an error signal to the server 2 (step A3), reports the error in the form of illuminating the top lamp 49 or the like (step A4), and then ends the routine.

On the other hand, in A2, when the main CPU 41 determines that all the check results are normal (A2: YES), a boot signal is output to the server 2 (step A5). Then the game program, the game system program and the like are read out from the RAM 43 (step A6). Based on the programs having been read out, a demo-screen is displayed on the central liquid crystal panel 5B or the like (step A7), and the execution of the routine is then terminated.

Figure 9:
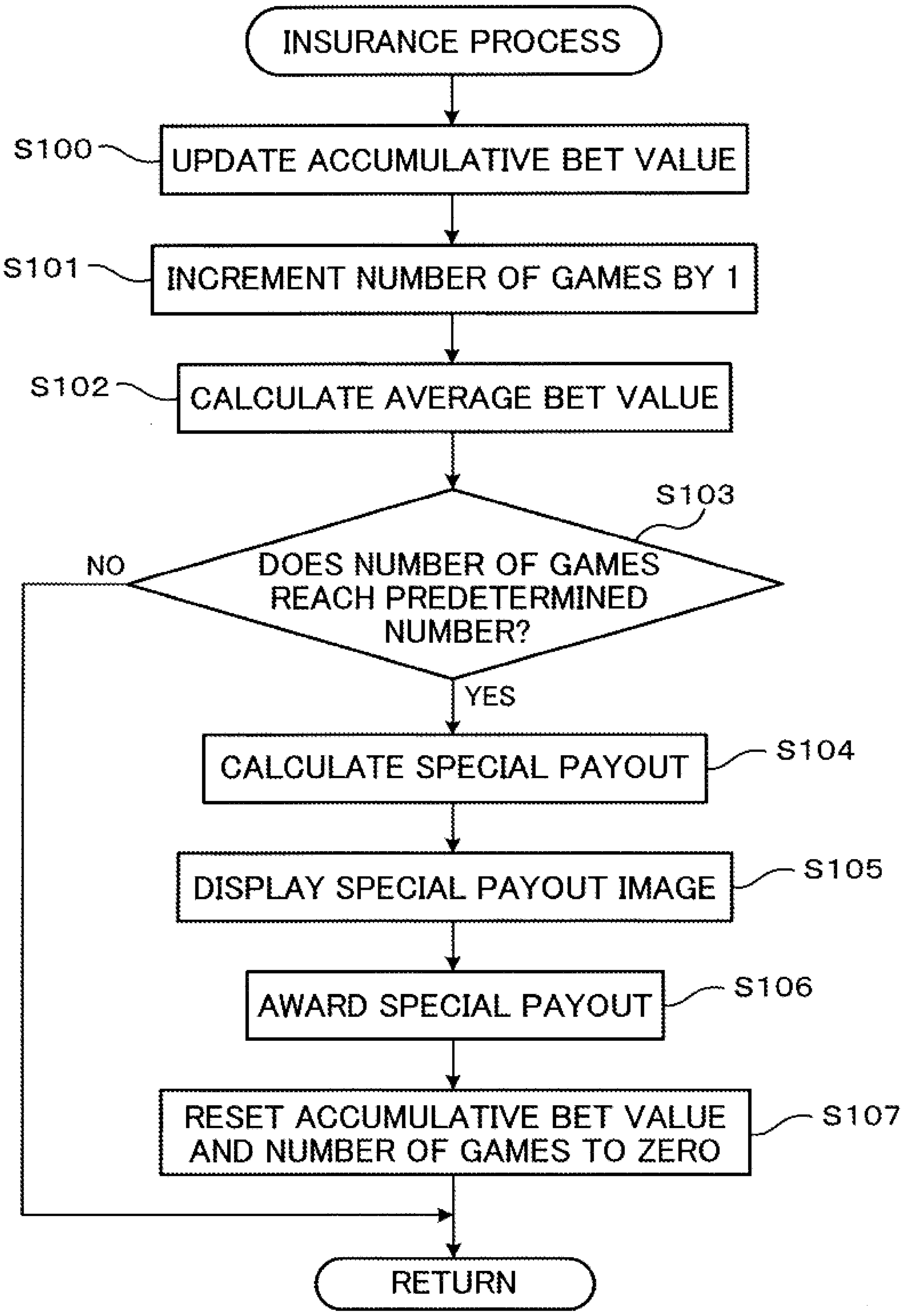
FIG. 9 is a flowchart of an insurance process executed by the gaming machine.

After the aforesaid initial process, the base game running process of FIG. 8, the insurance process of FIG. 9, and the insurance mode shifting process of FIG. 10 become executable.

While the present invention is described in connection with a practical embodiment, it should be appreciated that the invention is not limited to the disclosed embodiment, and the specific arrangements such as means cover various modifications and equivalent arrangements. The effects described in the embodiments are merely listed as most favorable effects of the present invention, and hence the effects of the present invention is not limited to those described in the embodiments of the present invention.

For example, a base game of the present embodiment is switchable between the insured mode and the uninsured mode, but the present invention is not limited to this. For example, a base game may be fixed to the insured mode. In such a case, the base game running process of FIG. 8 does not include the determining process of the step S17, and hence the insurance process of FIG. 9 is always executed. This simplifies a base game and thereby facilitating the participation of inexperienced players.

In addition to the above, for example, the gaming machine 10 may be possible to run both a base game switchable between the insured mode and the uninsured mode and a base game fixed to the insured mode. This increases the diversity of the gaming machine 10 and hence the entertainment characteristic is improved.

In the present embodiment, a special payout is awarded when unit games are played for a predetermined number of times. The present invention, however, is not limited to this. For example, a special payout may be paid out when symbols form a predetermined arrangement in a slot game and/or a special payout may be awarded when the difference between an accumulated bet value and a payout amount becomes not smaller than a predetermined value.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. Steps for yielding one result shall be understood as a process with no self-contradiction. Further, the electrical or magnetic signal is transmitted/received and written in the respective steps. It should be noted that such a signal is expressed in the form of bit, value, symbol, text, terms, number, or the like solely for the sake of convenience. Although the present specification occasionally personifies the processes performed in the steps, these processes are essentially executed by various devices. Further, the other structures necessary for the steps are obvious from the above descriptions.

What is claimed is:

1. A gaming machine comprising:

a bet input unit which makes it possible to input a bet;

a base game in which a unit game which starts in response to the input of a bet can be repeatedly run;

a bet value memory in which a bet value of the bet is accumulatively stored;

a display unit proximate the bet input unit to display game information to a player; and a controller which is programmed to perform the steps of:

(a1) receiving the input of the bet from the bet input unit;

(a2) after receiving the input of the bet, running the unit game at a predetermined timing and awarding a base payout based on a result of the unit game and the bet value of the bet;

(a3) in the base game, accumulatively storing the bet value in the bet value memory each time the unit game is run;

(a4) in the base game, counting how many times the unit game is run;

(a5) calculating an average bet value of the counted unit game, based on the bet value accumulatively stored in the bet value memory;

(a6) displaying the calculated average bet value on the display unit; and (a7) when a predetermined condition is met in the base game, awarding a special payout which is calculated by multiplying the average bet value by a predetermined value.

2. The gaming machine according to claim 1, further comprising:

a mode switch input unit which makes it possible to switch between an insured mode and an uninsured mode, wherein the controller is programmed to execute the steps (a3), (a4), (a5), (a6), and (a7) only when the mode switch input unit sets the gaming machine in the insured mode.

3. The gaming machine of claim 1, wherein the predetermined condition is independent of the result obtained each time the unit game is run.

4. The gaming machine of claim 1, wherein the predetermined value is independent of the number of unit games played.

5. The gaming machine of claim 1, wherein the bet value memory is not re-set in the base game until the controller awards the special payout.

6. A gaming machine comprising:

a bet input unit which makes it possible to input a bet;

a base game in which a unit game which starts in response to the input of a bet can be repeatedly run;

a bet value memory in which a bet value of the bet is accumulatively stored;

a display unit proximate the bet input unit to display game information to a player; and a controller which is programmed to perform the steps of:

(b1) receiving the input of the bet from the bet input unit;

(b2) after receiving the input of the bet, running the unit game at a predetermined timing and awarding a base payout based on a result of the unit game and the bet value of the bet;

(b3) in the base game, accumulatively storing the bet value in the bet value memory each time the unit game is run;

(b4) in the base game, counting how many times the unit game is run;

(b5) calculating an average bet value of the counted unit game, based on the bet value accumulatively stored in the bet value memory;

(b6) displaying the calculated average bet value on the display unit; and (b7) when the number of the unit game counted in step (b4) reaches a predetermined number, awarding a special payout which is calculated by multiplying the average bet value by a predetermined value.

7. The gaming machine according to claim 6, further comprising:

a mode switch input unit which makes it possible to switch between an insured mode and an uninsured mode, wherein the controller is programmed to execute the steps (b3), (b4), (b5), (b6), and (b7) only when the mode switch input unit sets the gaming machine in the insured mode.

8. The gaming machine of claim 6, wherein the awarding of the special payout is independent of the result obtained each time the unit game is run.

9. The gaming machine of claim 6, wherein the predetermined value is independent of the number of unit games played.

10. The gaming machine of claim 6, wherein the bet value memory is not re-set in the base game until the controller awards the special payout.

11. A game control method performed through a processor of a gaming machine, the processor performing the steps of:

(c1) receiving an input of a bet from a bet input unit;

(c2) after receiving the input of the bet, running a unit game at a predetermined timing and awarding a base payout based on a result of the unit game and a bet value of the bet;

(c3) in a base game in which the unit game can be repeatedly run, accumulatively storing the bet value of the bet in a bet value memory each time the unit game is run;

(c4) in the base game, counting how many times the unit game is run;

(c5) calculating an average bet value of the counted unit game, based on the bet value accumulatively stored in the bet value memory;

(c6) displaying to a player the calculated average bet value on a display unit proximate the bet input unit; and (c7) when a predetermined condition is met in the base game, awarding a special payout which is calculated by multiplying the average bet value by a predetermined value.

12. The game control method of claim 11, wherein the predetermined condition is independent of the result obtained each time the unit game is run.

13. The game control method of claim 11, wherein the predetermined value is independent of the number of unit games played.

14. The gaming machine of claim 11, wherein the bet value memory is not re-set in the base game until the processor awards the special payout.

* * * * *